(12) United States Patent
Gaughen et al.

(10) Patent No.: US 7,111,427 B1
(45) Date of Patent: Sep. 26, 2006

(54) LOBSTER TRAP

(76) Inventors: Kevin W. Gaughen, 528 Broad St., Weymouth, MA (US) 02189; Michael W. Gaughen, 528 Broad St., Weymouth, MA (US) 02189

( * ) Notice: Subject to any disclaimer, the term of this patent is extended or adjusted under 35 U.S.C. 154(b) by 0 days.

(21) Appl. No.: 11/230,427

(22) Filed: Sep. 20, 2005

Related U.S. Application Data

(63) Continuation-in-part of application No. 10/818,153, filed on Apr. 5, 2004, now abandoned.

(51) Int. Cl.
*A01K 71/00* (2006.01)

(52) U.S. Cl. ............................................. 43/100

(58) Field of Classification Search .......... 43/100–105; D22/121
See application file for complete search history.

(56) References Cited

U.S. PATENT DOCUMENTS

| | | | | |
|---|---|---|---|---|
| 2,731,761 A | * | 1/1956 | Marshall | 43/100 |
| 2,736,986 A | * | 3/1956 | Goldstein | 43/103 |
| 3,337,982 A | * | 8/1967 | Sajulan | 43/65 |
| 4,897,953 A | * | 2/1990 | Bruce | 43/102 |
| 5,353,541 A | * | 10/1994 | Jonason et al. | 43/105 |

* cited by examiner

*Primary Examiner*—Teri Pham Luu
*Assistant Examiner*—Kimberly S. Smith
(74) *Attorney, Agent, or Firm*—William Nitkin

(57) ABSTRACT

A lobster trap having at least two lobster feeding chambers separated from one another with no direct or indirect access from one lobster feeding chamber to the other(s), each lobster feeding chamber having a lobster trap head to the exterior of the lobster trap and a centrally disposed bait well accessible to each lobster feeding chamber, such lobster trap characterized by the lack of a parlor chamber.

9 Claims, 5 Drawing Sheets

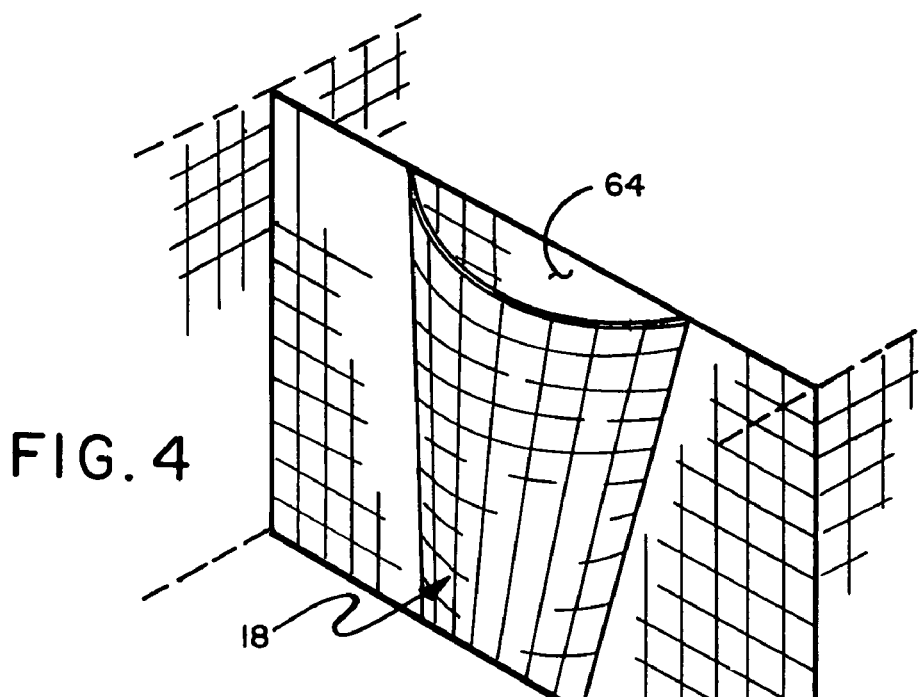
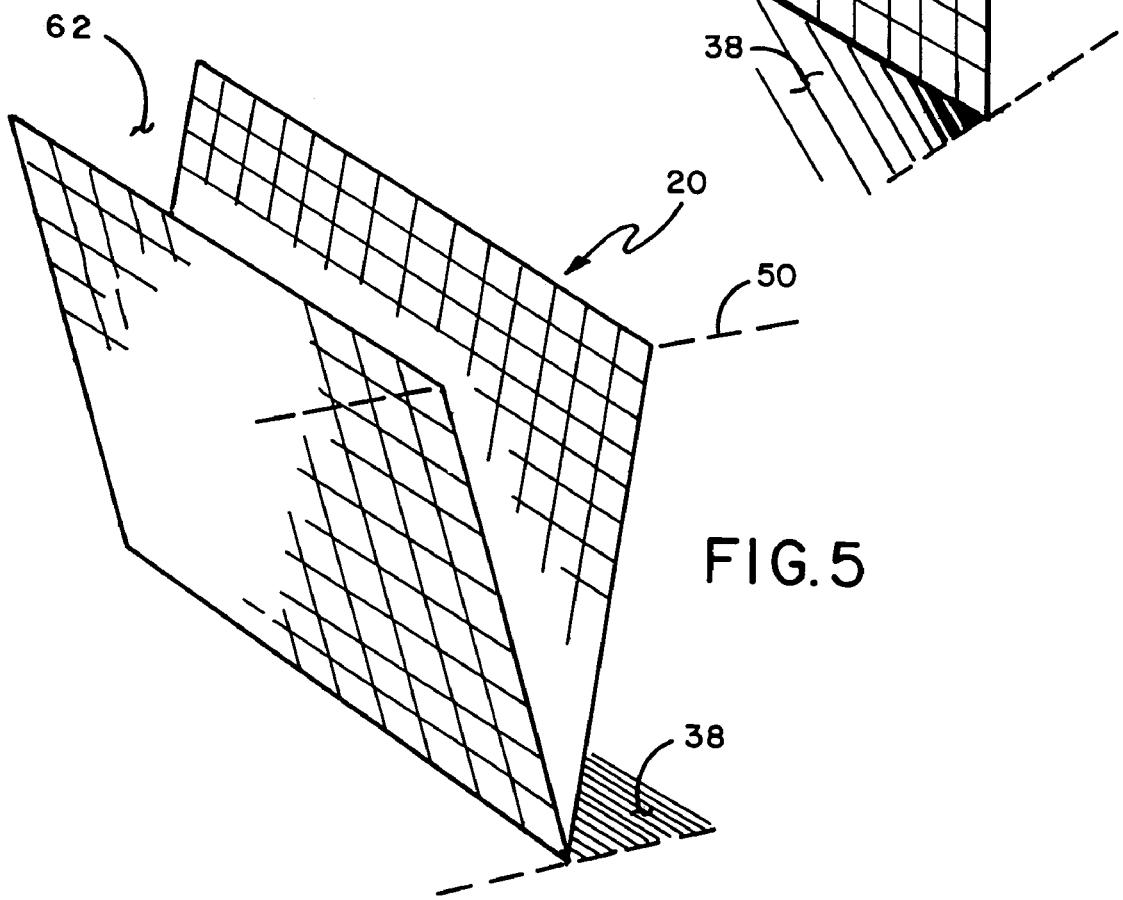

LOBSTER TRAP

This application is a continuation-in-part of our prior patent application entitled Multiple Feeding Chamber Lobster Trap with Self Closing Bait Well, Ser. No. 10/818,153 filed Apr. 5, 2004, now abandoned.

BACKGROUND OF THE INVENTION

1. Field of the Invention

The device of this invention resides in the field of lobster traps and more particularly relates to a lobster trap configuration having multiple feeding chambers and a central self-closing bait well and method of lobster trapping.

2. History of the Prior Art

Lobster fishing methods and traps have not substantially changed for more than 300 years. Traps used in colonial times were built in the same basic configuration as a modern trap. The only major changes have been in the shape of the trap from half-barrel shaped to rectangular and in the change from the use of wooden lathes to wire mesh construction. Traps suitable for lobstering are particularly designed to catch lobsters, and other types of traps are unsuitable for this purpose.

Lobster fisheries have continually increased catches for decades without a diminution of, or damage to, the breeding stock of the species. The reason behind this fact puzzled scientists until recently. Advances in optics and waterproofing of cameras have led to the scientific study of lobsters in their native habitat. "Lobster cams" can be found on the Internet, recording the actions of lobsters in and around lobster traps twenty-four hours a day. Such devices and studies have led to a better understanding of lobster feeding and activity patterns during both day and night.

Existing lobster traps were built on the assumption that most lobsters would enter the trap at night to feed but would be unable to find the exit. The trap would be hauled at a later date to collect lobsters unable to exit the trap. Modern studies, however, show that 96% of all lobsters which enter a trap do so during the day, where they eat and leave. The lobster caught in the trap is the one unlucky enough to be eating in the trap when the trap is pulled. Studies also show that lobsters will not enter a trap if a larger lobster is present in the feeding chamber, but will actually dig nests or "dugouts" under a trap to wait their turn to feed.

Current lobster traps are equipped with only one feeding chamber and waste one-half to two-thirds of the interior room in the trap utilizing nets designed to make it difficult for lobsters to exit. Unfortunately the lobsters seem to have learned the way out of such traps. Lobsters have no difficulty navigating two-compartment traps. Current traps additionally require the bait to be placed in a bait bag and tied in the sleeper compartment of the trap. If bait is placed loose in the lobster trap, it is easily removed by the lobster. Thus current traps are actually feeding stations for lobsters. Given this easily obtained supply of food, it is little wonder that lobster breeding stocks are continuing to increase.

In the prior art a lobster trap is usually a weighted semicircular or rectangular-shaped wooden or plastic-coated wire mesh box dropped to the ocean floor and tethered to a buoy for location and retrieval. Although the industry uses the term "lobster pot" interchangeably with "lobster trap." for purposes of describing the present invention, the term "lobster trap" or "trap" will be used herein.

Prior art lobster trap configurations 100, as seen in FIG. 1, divide the trap into two types of compartments, the first being an entry where the crustacean enters the trap which is variously called the entry, parlor or kitchen depending on the locale. "Parlor" 102 will be used for purposes of naming this compartment herein. The second type of compartment is the area where the lobster has access to the bait, which area is only accessible from the first compartment. This second compartment is confusingly also called the parlor, sleeper or kitchen depending on the locale in which the trap is being used. For the purposes herein "sleeper" 106 will be used to describe this second compartment which contains the bait bag and which lacks direct access to the ocean.

Traditional prior art lobster traps, as seen in FIG. 1, are usually configured with two entrance funnels referred to as "fishing heads" or "heads" such as head 108, as referred to herein. In a traditional prior art lobster trap these two heads normally allow lobster entry into parlor 102 and are formed by cord netting that tapers inwardly toward the interior of the trap. Heads are generally located on opposite sides of parlor 102. The heads may or may not be equipped with one-way gates.

A semicircular malleable metal wire ring made of steel or aluminum constricts each head's funnel near its interior opening. Many of today's traps are assembled with hog ring clips. These rings can be closed by compression using a specially designed pair of pliers. The use of such rings of various types is standard in the lobster fishing industry for fasteners of the various trap hinges and at other trap locations.

Prior art traps require the use of string mesh bait bags 110 into which the bait must be pre-loaded with great effort and mess. After a trap is hauled, the used bait bag 110 with rotted fish is removed from the trap by lifting lid 104, saved for reuse and a new full bait bag is tied in the trap in the sleeper compartment 106.

SUMMARY OF THE INVENTION

The invention herein provides for a new design of a lobster trap which puts to use the knowledge gained from current scientific studies on the abilities and habits of lobsters. Use of lobster traps of the present invention minimizes the time and effort spent by a lobsterman to check and re-bait his traps and maximizes the potential for trapping one or more lobsters in each trap when hauled. The trap of this invention is characterized by the lack of a "parlor" chamber, instead providing for two or more feeding chambers, each individually accessible from outside the trap, with no way for lobsters which enter the trap to move from one feeding chamber to another and thus cannot gain access to other lobster(s) in other feeding chambers. Each feeding chamber has access to a central bait well which is opened for filling at the same time the cover lid or hatch of the lobster trap is opened and is closed when the cover lid or hatch is closed without any other action being necessary.

The lobster trap of this invention reduces the work of the lobsterman by eliminating the need to fill and attach new bait bags in a trap and to remove used bait bags for refilling. No parlor is provided in the interior of the trap of this invention. The interior of the present invention contains two or more feeding chambers, each with separate direct access to the exterior of the trap. By eliminating the parlor compartment from the lobster trap, which parlor is not necessary as lobsters can escape from them, more feeding chambers can be provided in which more lobsters can be fed; and if more lobsters are in the feeding chambers when the trap is pulled, more lobsters will be caught. Further, in the invention herein, a separate single head opens directly into its respective feeding chamber of the trap rather than two head openings into a parlor chamber as found in the prior art. No entry is provided from one feeding chamber to another, and there is thus no problem of a lobster occupying one feeding chamber frightening away another lobster from entering an unoccupied feeding chamber of the trap. In various embodiments of our invention the bait well can be an interior feeding envelope, a V-shaped feeder or central bait well, and various interior partitions can be provided and fastened inside the trap by hog rings or by any other suitable clips or bands.

In the present invention the bait bag of the prior art is replaced with a central bait well made of wire mesh which bait well is adjacent and accessible to lobsters in all feeding chambers of the trap through the wire mesh. The bait well is accessible and refillable when the cover of the trap is opened to remove the catch, and the bait well can be refilled without the need of providing new bait bags and tying them in place. Remaining rotted bait is drawn to the bottom of the bait well by gravity and remains as an attractant for lobsters and results in the conservation of resources for the lobsterman.

Thus, it is an object of this invention to provide multiple feeding chambers in a single lobster trap in each of which a lobster can feed without contact with other lobsters in other feeding chambers in the same trap.

It is a further object of this invention to eliminate the use of bait bags by creating a fixed interior bait well.

It is yet a further object of this invention to make the bait well and feeding chambers accessible to the lobsterman upon opening the cover or hatch of the trap.

It is yet a further object of this invention to provide a central bait well and to provide at least one partition which will separate the lobster trap into two or more feeding chambers and which will prevent lobsters in one feeding chamber from gaining access to lobsters in any other feeding chamber in the trap.

BRIEF DESCRIPTION OF THE DRAWINGS

FIG. 4 illustrates a perspective view of an envelope-style bait well made of wire mesh material.

FIG. 5 illustrates a perspective view of a V-shaped bait well made of wire mesh material.

DESCRIPTION OF THE PREFERRED EMBODIMENT(S)

Figure 1:
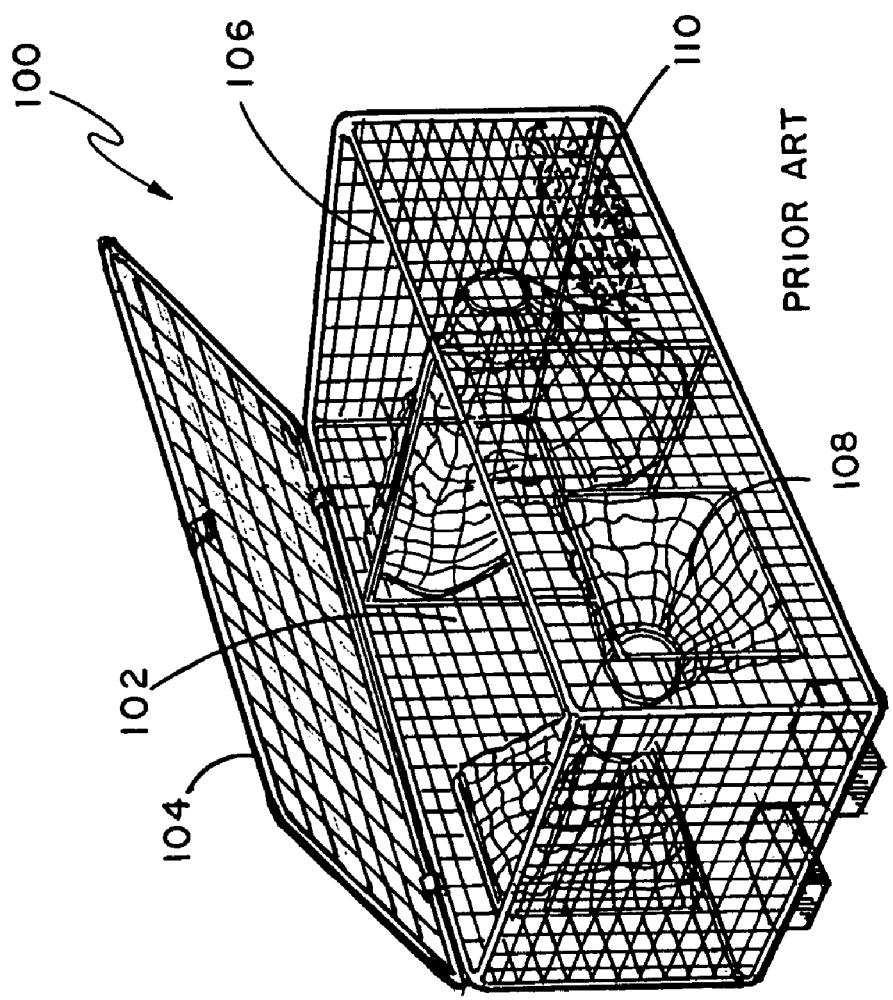
FIG. 1 illustrates a front perspective view of a traditional lobster trap of the prior art.
Figure 2:
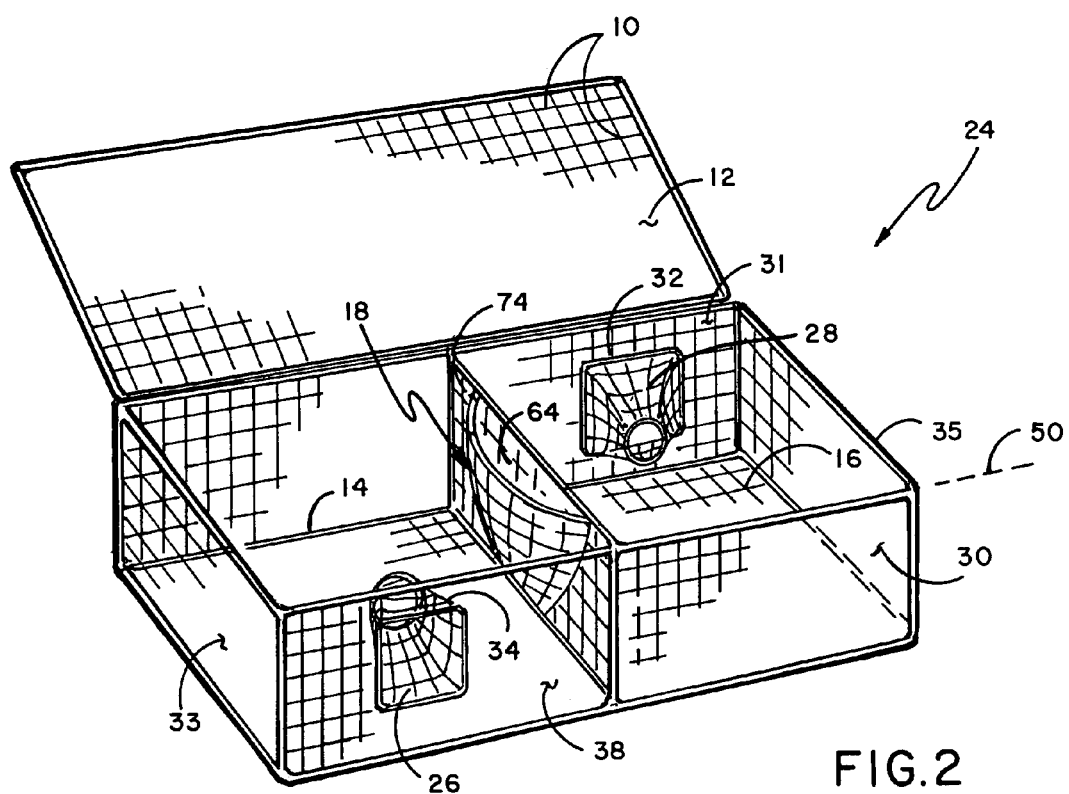
FIG. 2 illustrates a front perspective view of the rectangular lobster trap of this invention made of wire mesh showing the central bait well and the feeding heads composed of fixed openings with funnel-shaped nets, each leading into a separate feeding chamber.

As seen in FIG. 2 lobster trap 24 of this invention is formed by creating a rectangular box composed of wire mesh 10 or other suitable material. Lobster trap 24 has first, second, third and fourth sides 30, 31, 33 and 35 and base 38. One section of trap 24 is hinged and forms cover 12. In one embodiment of the invention first and second head openings 26 and 28 are defined, respectively, in first and second sides 30 and 31 of trap 24; and first and second mesh funnel attachments 32 and 34 are affixed, respectively, to second and first head openings 28 and 26 in standard fashion and enter into second and first feeding chambers 16 and 14, respectively, as seen in FIG. 2.

Figure 6:
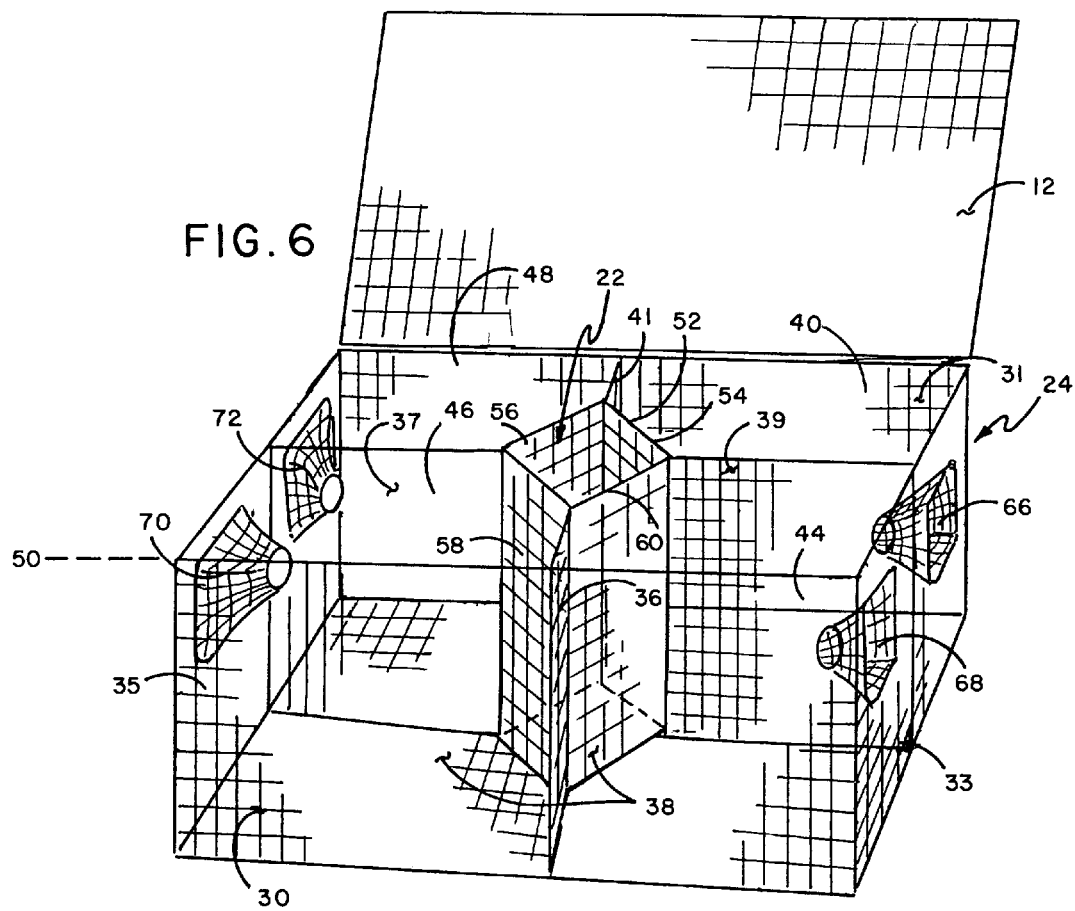
FIG. 6 illustrates a front perspective view of the embodiment of the lobster trap of this invention shown in its open mode and having four feeding chambers, a central bait well, and a separate feeding head opening for each feeding chamber.

An envelope bait well 18 having an opening 64 is centrally disposed between the two feeding chambers. In an alternate embodiment, as seen in FIG. 6, are vertically disposed first, second, third and fourth partitions 36, 37, 41 and 39 and vertically disposed first, second, third and fourth wire mesh members 54, 56, 58 and 60 in the interior of trap 24 which are made of wire mesh or other suitable material. These partitions are each affixed to at least one side and to base 38 of trap 24 and with the wire mesh members they form four feeding chambers, being first, second, third and fourth feeding chambers 40, 44, 46 and 48. As discussed further below, first, second, third and fourth partitions 36, 37, 41 and 39 and the wire mesh members are attached and fitted together to form bait well 22 in the center of trap 24 for the insertion of bait therein and which bait well 22 is closed at its bottom by trap base 38 and open at its top. As seen in FIG. 2 bait well 18 is affixed to base 38 and is incorporated within partition 74 which is attached vertically to at least two sides of trap 24, being first side 30 and second side 31. Each head is made of the aforesaid mesh of its funnel attachment has and exclusive access to only one feeding chamber of the trap. Each feeding chamber, such as first, second, third and fourth feeding chambers 40, 44, 46 and 48, as seen in FIG. 6, has separate and distinct access to central bait well 22. Top outer edge 52 of bait well 22 is flush with level 50 of trap 24. Cover 12 is hinged in such a fashion that when closed, it lies flat across the top outer edge of trap 24 and covers the top opening of bait well 22 such that cover 12 prevents any bait placed within bait well 22 from being removed from the top opening. Cover 12, when closed, also covers over first, second, third and fourth feeding chambers 40, 44, 46 and 48 of trap 24 and assists in preventing the escape of lobsters. Cover 12 can be locked in its closed position by means of a standard elastic loop or strap or equivalent closure means, not shown.

The central bait well can take many forms, such as bait well 22 in FIG. 6 which is formed by angular first, second, third and fourth wire mesh members 54, 56, 58 and 60. Each of these wire mesh members interconnect with their adjacent partitions, such as first wire mesh member 54 attaching to third partition 39 and fourth partition 41, thereby forming first feeding chamber 40 and providing access from feeding chamber 40 to the bait, not shown, in bait well 22 through the openings in first wire mesh member 54. In the same way the second, third and fourth wire mesh members 56, 58, and 60 connect to other adjacent partitions, as described below, to form central bait well 22 that is enclosed on four sides and base 38, with the opening at the top of the bait well being closed when cover 12 is in its closed position. Fourth wire mesh member 60 attaches to third partition 41 and first partition 36 to form second feeding chamber 44, and third wire mesh member 58 attaches to first partition 36 and second partition 37 to form third feeding chamber 46. Second wire mesh member 56 attaches to second partition 37 and fourth partition 39 to form fourth feeding chamber 48. Thus four feeding chambers are provided having a central bait well 22 which bait well can be accessed by lobsters within trap 24 through the openings in each wire mesh member from each of the feeding chambers. Other types of bait wells can be used, as described below, and configurations can be made with many feeding chambers accessing a unitary central bait well. In FIG. 2 trap 24 has two feeding chambers, being first and second feeding chambers 14 and 16, each having a respective first and second head 26 and 28 therein, such first and second feeding chambers 14 and 16 being separated from one another by a centrally disposed partition 74 extending from first side 30 to second side 31 of trap 24 to which partition envelope-style bait well 18 is attached. Envelope-style bait well 18 can be opened for the positioning of bait therein when cover 12 is lifted. Envelope-style bait well 18 can be made of wire mesh, open-mesh fabric material or equivalent material as long as it is able to perform its functions of separating the occupant(s) of first feeding chamber 14 from the occupant(s) of second feeding chamber 16 and providing access to bait contained therein through its open mesh to lobsters in both first feeding chamber 14 and second feeding chamber 16.

FIG. 4 illustrates envelope-style bait well 18 shown apart from trap 24, showing its opening 64 for receipt of bait.

Figure 3:
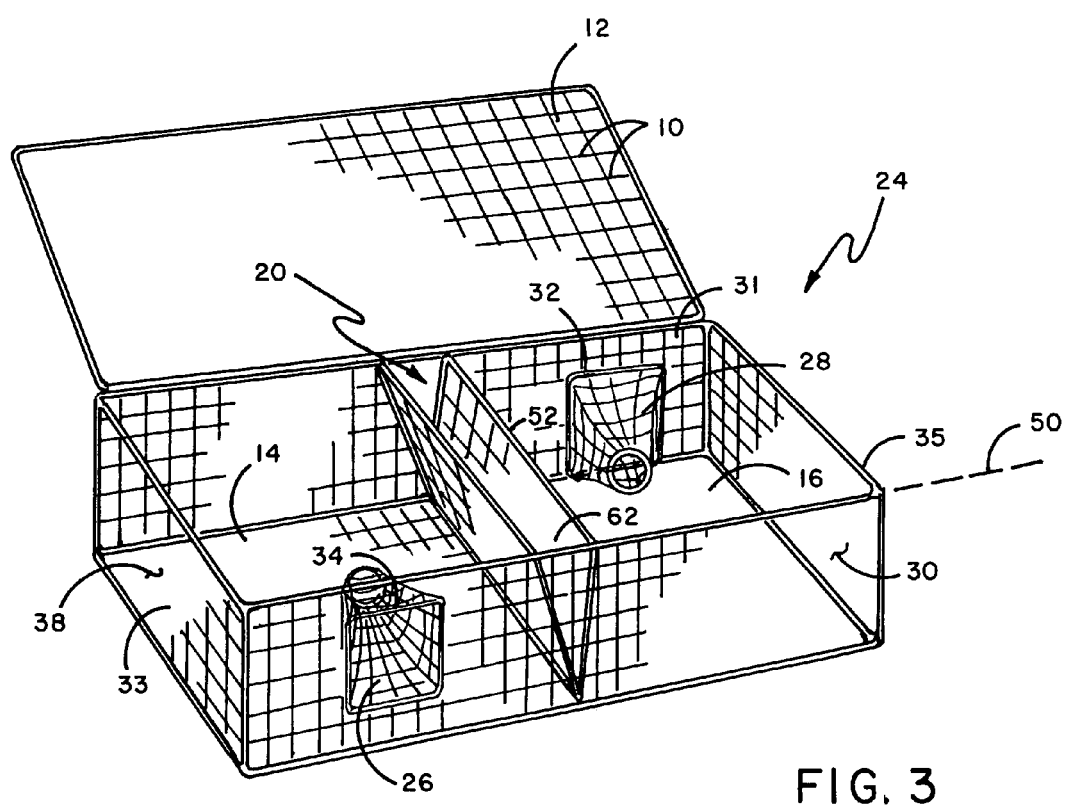
FIG. 3 illustrates a front perspective view of the lobster trap of this invention having a V-shaped bait well and feeding heads composed of fixed openings with funnel-shaped nets, each leading into a separate feeding chamber.

In an alternate embodiment the envelope-style bait well 18 seen in FIG. 2 can be replaced by a V-shaped bait well, as seen in FIG. 3, within trap 24 and as shown separately in FIG. 5. V-shaped bait well 20 can extend from first side 30 to second side 31 and has the pointed edge of the "V" attached to trap base 38. Outer edge 52 of bait well 20 is aligned with level 50 of trap 24 such that when cover 12 is closed, the bait well and first and second feeding chambers 14 and 16 are closed; and when cover 12 is opened, there is easy access for the lobsterman to place bait into opening 62 of V-shaped bait well 20 as well as providing lobsters access for feeding through the mesh along the bait well's sides from first and second feeding chambers 14 and 16.

Although the present invention has been described with reference to particular embodiments, it will be apparent to those skilled in the art that variations and modifications can be substituted therefor without departing from the principles and spirit of the invention.

We claim:

1. A lobster trap having an interior and an exterior and made of wire mesh material, comprising:
    at least two lobster feeding chambers disposed within said interior of said trap, each of said lobster feeding chambers separated from one another with no access from one of said lobster feeding chambers to another of said lobster feeding chambers within said trap and preventing lobsters from gaining access to one another if they are in different feeding chambers;
    a lobster trap head in each of said lobster feeding chambers for lobsters to enter each of said lobster feeding chambers from said exterior of said trap; and
    a bait well centrally disposed within said trap having a height, a top, and a top edge, said bait well having an opening defined at its top for receipt of bait, said bait well adjacent and accessible to each of said lobster feeding chambers, said lobster trap further characterized by a lack of a parlor chamber.

2. The lobster trap of claim 1 further including:
    vertically disposed first, second, third and fourth sides each having the same height, a length, a top edge and a bottom edge, said first and third sides having the same length and said second and fourth sides having the same length, said bottom edges of said first, second, third and fourth sides when joined together forming the dimensions of a rectangle;
    a base having the same dimensions as said rectangle, said base attached to said bottom edges of said first, second, third and fourth sides;
    said top edges of said first, second, third and fourth sides forming a level being the height of said lobster trap;
    a cover hingeably attached to a top edge of one of said sides, said cover having the same dimensions as the dimensions of said rectangle, said cover adapted to open and close, said cover when closed, covering said opening at the top of said bait well and the top edges of said first, second, third and fourth sides of said trap; and
    said top edge of said bait well being disposed at the same height as the height of said sides of said trap.

3. The lobster trap of claim 1 wherein said centrally disposed bait well is formed in a V-shape of wire mesh material, said bait well separating said lobster feeding chambers from one another, said V-shaped bait well having an opening defined therein at its top for receiving bait therein.

4. The lobster trap of claim 1 wherein said centrally disposed bait well is formed in an envelope configuration, said bait well separating said lobster feeding chambers from one another, said envelope having an opening defined at its top for receiving bait therein.

5. The lobster trap of claim 2 wherein said centrally disposed bait well is formed in a V-shape of wire mesh material, said V-shaped bait well extending from said first side to said third side and from said base to said level of said top edges of said sides of said trap, said V-shaped bait well separating said feeding chambers from one another, said V-shaped bait well having an opening defined therein at its top for receiving bait therethrough.

6. The lobster trap of claim 2 wherein said centrally disposed bait well is formed in an envelope configuration, said bait well extending from said first side to said third side and from said base to said level of said top edges of said sides of said trap, said bait well separating said lobster feeding chambers from one another, said envelope having an opening defined at its top for receiving bait therein.

7. The lobster trap of claim 2 further including:
    first, second, third and fourth vertically disposed internal partitions separating said trap into four lobster feeding chambers, each lobster feeding chamber having a separate lobster trap head open to the exterior of said trap to allow for the entrance of lobsters into each lobster feeding chamber.

8. The lobster trap of claim 7 further including:
    vertically disposed first, second, third and fourth wire mesh members, said first, second, third and fourth wire mesh members forming said central bait well, said central bait well having first, second, third and fourth sides, said first wire mesh member attached to said third and fourth partitions to form said first side of said bait well, said second wire mesh member attached to said second and fourth partitions to form said fourth side of said bait well, said third wire mesh member attached to said first and second partitions to form said third side of said bait well, said fourth wire mesh member attached to said third and first partitions to form said second side of said bait well.

9. A method of catching lobsters comprising the steps of:
    providing a lobster trap having at least two lobster feeding chambers;
    separating said lobster feeding chambers from one another;
    preventing access of lobster(s) in one lobster feeding chamber from accessing lobster(s) in other lobster feeding chambers within said trap;
    providing a lobster trap head in each of said lobster feeding chambers;
    disposing a bait well within said trap, said bait well adjacent and accessible to each of said lobster feeding chambers;
    providing an opening defined in the top of said lobster trap for gaining access to said bait well and to said lobster feeding chambers; and
    providing a lid for closing said lobster feeding chambers and said bait well.

* * * * *

UNITED STATES PATENT AND TRADEMARK OFFICE
CERTIFICATE OF CORRECTION

PATENT NO. : 7,111,427 B1  Page 1 of 1
APPLICATION NO. : 11/230427
DATED : September 26, 2006
INVENTOR(S) : Gaughen et al.

It is certified that error appears in the above-identified patent and that said Letters Patent is hereby corrected as shown below:

In the Specification:

Column 3, line 2, change "first second" to --first and second--.

Signed and Sealed this

Twelfth Day of June, 2007

JON W. DUDAS
*Director of the United States Patent and Trademark Office*